United States Patent
Tiberghien et al.

(10) Patent No.: US 10,018,293 B2
(45) Date of Patent: Jul. 10, 2018

(54) MALE FLUIDIC CONNECTING ELEMENT AND CONNECTOR COMPRISING SUCH AN ELEMENT AND A FEMALE MATING ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR)

(73) Assignee: STAUBLI FAVERGES, Faverges (FR)

( * ) Notice: Subject to any disclaimer, the term of this patent is extended or adjusted under 35 U.S.C. 154(b) by 599 days.

(21) Appl. No.: 14/629,579

(22) Filed: Feb. 24, 2015

(65) Prior Publication Data
US 2015/0338006 A1 Nov. 26, 2015

(30) Foreign Application Priority Data

May 23, 2014 (FR) .................................... 14 54701

(51) Int. Cl.
*F16L 37/18* (2006.01)
*F16L 37/098* (2006.01)
*F16L 21/08* (2006.01)

(52) U.S. Cl.
CPC ........... *F16L 37/0982* (2013.01); *F16L 21/08* (2013.01); *F16L 37/098* (2013.01); *F16L 37/0985* (2013.01)

(58) Field of Classification Search
CPC . F16L 37/0982; F16L 37/0985; F16L 37/098; F16L 21/08
USPC ................................. 285/308, 312, 314–316
See application file for complete search history.

(56) References Cited

U.S. PATENT DOCUMENTS

| 3,572,776 | A | * | 3/1971 | Herd | E21B 43/0107 |
| | | | | | 285/315 X |
| 4,026,581 | A | | 5/1977 | Pasbrig | |
| 4,781,400 | A | | 11/1988 | Cunningham | |
| 5,547,166 | A | * | 8/1996 | Engdahl | F16L 37/0848 |
| | | | | | 285/316 X |
| 6,910,719 | B1 | | 6/2005 | Zeleny et al. | |
| 8,882,080 | B2 | * | 11/2014 | Tiberghien | F16L 37/1215 |
| 9,121,534 | B2 | * | 9/2015 | Aoki | F16L 21/08 |

(Continued)

FOREIGN PATENT DOCUMENTS

| CN | 203560646 | 4/2014 |
| WO | 2011/006591 A1 | 1/2011 |

OTHER PUBLICATIONS

French Search Report for FR 1454701 dated Jan. 12, 2015.

*Primary Examiner* — Gregory J Binda

(57) ABSTRACT

A male connecting element and a connector comprising the male connecting element and a female connecting element are disclosed. The male connecting element comprises a tubular body and a tubular plug, for the passage of fluid, having a flange for hooking up one or more claws of a female element. The body includes a sleeve that is axially movable around the plug between a first position where it is away from the flange, and a second position where it is closer to the flange or in abutment to the flange. The sleeve allows the male element to move axially away then radially clearing each claw of the flange before removal of the male element out of the female element. Advantageously, the claws avoid abutting against the flange of the male element upon uncoupling, thereby minimizing wear and tear of the claws against the flange.

16 Claims, 13 Drawing Sheets

(56) References Cited

U.S. PATENT DOCUMENTS

2006/0208484 A1 9/2006 Swift
2012/0119485 A1 5/2012 Cichorek et al.

* cited by examiner

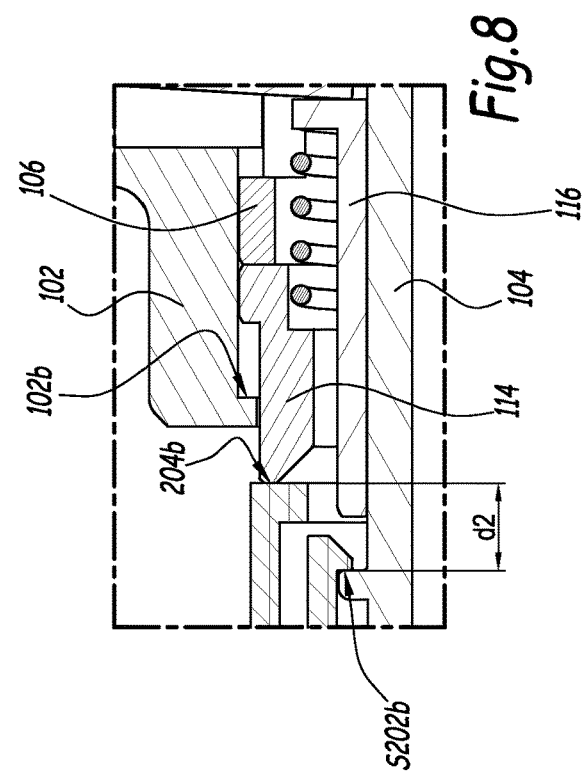
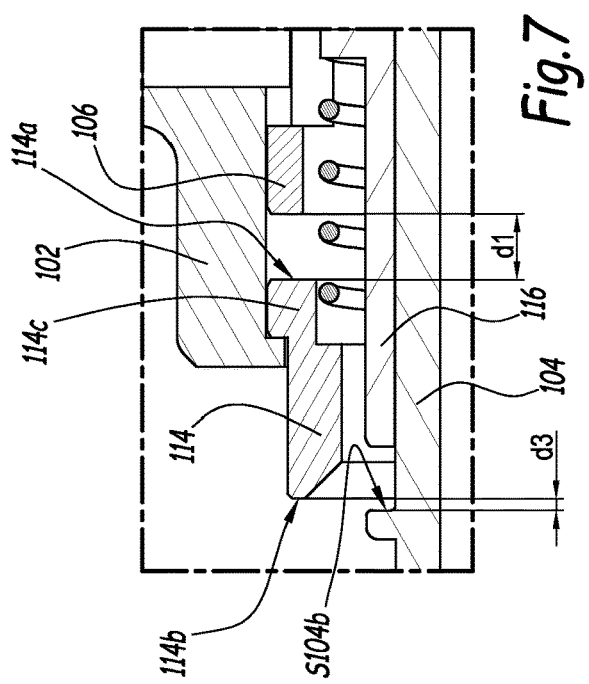

MALE FLUIDIC CONNECTING ELEMENT AND CONNECTOR COMPRISING SUCH AN ELEMENT AND A FEMALE MATING ELEMENT

The invention relates to a male fluidic connecting element and to a connector comprising such a male element and a female mating element.

A fluidic connector according to the invention is particularly used in the field of the automotive industry. Indeed, during test phases of engines of new vehicles, the engines are installed on test benches, on which they are temporarily connected to auxiliary fluid circuits. Once the test phases have been completed, the engines are disconnected from these auxiliary circuits so as to be definitively connected to supply circuits in the engine compartment of the vehicles. The connections are made by means of connectors, which are rapidly connectable and disconnectable.

BACKGROUND OF THE INVENTION

In a known way, the fluidic connectors of engines mounted on test benches comprise a female element in plastic material which has elastic claws adapted so as to be hooked up on a flange of a male tubular plug for passage of fluid. The mounting and dismounting cycles of engines and the successive operations for coupling and disconnecting connectors use the elastic claws of the female element.

WO-A-2011/006591 discloses a fluidic connector comprising a female connecting element connected to a duct and a male tubular plug for passage of the fluid. The female element comprises elastic claws which retain a flange of the male plug. In order to uncouple the male plug and the female element, the operator maneuvers tabs positioned around the claws for pressing on the latter and having them swing into a configuration where they are no longer engaged with the flange of the male plug and where the male plug may be removed from the female element. This uncoupling is not convenient for the operator since the latter has to maneuver parts which are accessible with difficulty. Further, if the operator does not sufficiently press on the locking claws, the latter risk being damaged, or even detached from the contact of the flange, upon removal of the male plug.

In order to overcome this drawback, the female end piece of certain connectors is equipped with a sheath which is axially mobile and maneuvered for unhooking the claws from the flange engaged on the male element with view to disconnecting the connector. This sheath in fact pushes the claws towards the outside so that the male plug may be removed from the female element without the locking claws being hooked up by the flange. However, the maneuvering of the sheath is not secured, i.e. the member for controlling displacement of the sheath is not blocked in the coupled configuration and an operator not paying any attention may uncouple the connector inadvertently or by poor use. Further, this system has the drawback that the claws are caused to be worn by friction on contact with the flange when they are unhooked forcibly.

These are the drawbacks which the invention is more particularly meant to find a remedy, by proposing a more robust and more secured male fluidic connecting element.

For this purpose, the invention relates to a male fluidic connecting element comprising:
- a tubular body, which defines a central axis and a distal mouth, and
- a tubular plug for passage of the fluid, which is positioned coaxially inside the body, which juts out axially from the body and which includes a flange for hooking up one or several claws of a female element.

According to the invention, the male element further comprises:
- a sleeve, which is movable axially around the plug between a first position, where it is far from the flange and a second position where it is close to the flange or in abutment against the flange,
- a member for controlling displacement of the sleeve from its first to its second position, and
- a device for locking the control member, comprising:
  - a first portion able to slide inside the body around the tubular plug between a distal position of the first portion where it prevents maneuvering of the control member and a proximal position of the first portion where it does not oppose any maneuvering of the control member in order to move the sleeve from its first to its second position, and
  - a second portion, which is able to slide inside the body around the tubular plug between a distal position of the second portion and a proximal position of the second portion, which is able to drive the first portion of the device from its distal position to its proximal position and which has an accessible distal end at the mouth of the body.

FIELD OF THE INVENTION AND BRIEF SUMMARY OF THE INVENTION

By means of the invention, the presence of the deblocking sleeve gives the possibility of moving axially away and then radially clearing each claw of the flange before removal of the male element out of the female element. Thus, claws do not risk abutting against the flange of the plug of the male element upon uncoupling and are less stressed in the long run. Further, the locking device prevents maneuvering of the control member in the distal position, which prevents unfortunate action of the operator on the control member. In order to uncouple the connector, the operator should first bring the male element and the female element closer together in order to push back the locking ring into the proximal position, which is more secure. This actually gives the possibility of avoiding involuntary uncoupling of the connector, following an unfortunate action from an operator on the control member. This also allows the claws for hooking up on the flange to be moved away from the male element before moving them away in order to save wear and tear of the claws against the flange.

According to advantageous but non-mandatory aspects of the invention, a male fluidic connecting element may include one or more of the following features, taken in any technically acceptable combination:
- The male element comprises an elastic compressive member, which is supported between the second portion of the locking device on the one hand and, on the other hand, the sleeve, and which is able to ensure return of the second portion into its distal position and of the sleeve into its first position.
- The control member comprises a jointed lever on the body around an orthoradial axis to the central axis and the lever comprises a finger for pushing the sleeve towards its second position, which extends through an aperture of the first portion of the locking device.
- The lever includes a heel for blocking pivoting of the lever, which abuts against the first portion of the locking device when the latter is in a distal position.

The sleeve has an outer diameter greater than the diameter of the flange of the plug.

The first portion of the locking device is a locking ring and the second portion of the locking device is a probing ring which is axially shifted, along the central axis relatively to the locking ring, and which is able to push back the locking ring towards it proximal position.

The probing ring is axially movable relatively to the body without driving the blocking ring between its distal position and an intermediate position, where it comes into contact with the locking ring.

The element comprises a member exerting a force for elastically returning the locking ring into its distal position.

The locking device is a one-piece assembly consisting of a first proximal portion and of a second distal portion, the assembly being movable between a distal position where the proximal portion of the locking device prevents maneuvering of the control member, and a proximal position where the proximal portion of the device does not oppose maneuvering of the control member.

The tubular plug comprises a proximal portion and a distal portion, bearing the flange and axially movable relatively to the body against the return force of a spring between an advanced position and a set-back position.

The proximal portion of the plug is fixed relatively to the body, while the plug includes a ball for stopping the distal portion of the plug in advanced position.

The invention also relates to a fluidic connector including a male element as described earlier and a female element including at least one claw, having a surface for hooking up with the flange of the male element. The sleeve is able to clear each claw when the latter is moved from its first to its second position.

According to advantageous but not mandatory aspects of the invention:

The female element comprises a pusher, having a pushing surface from the end of the second portion of the locking device, this end being accessible to the pusher at the mouth of the body.

A distance between the hooking-up surface and the pushing surface is greater than a distance, measured in parallel with the central axis, between a blocking face belonging to the flange and a contact surface between the second portion of the locking device in its distal position and the female element.

The first portion of the locking device prevents maneuvering of the control member when the hooking-up surface of the claw is engaged with the flange of the male element.

The control member is maneuverable after bringing the male and female elements closer to each other as compared with a coupled configuration of the connector.

BRIEF DESCRIPTION OF THE DRAWINGS

The invention and other advantages thereof will become more clearly apparent in the light of the description which follows of several embodiments of a male element, of a female element and of a fluidic connector according to its principle, only given as an example and made with reference to the drawings wherein:

FIG. 7 is a view at a larger scale of the box VII of FIG. 1, FIG. 8 is a view at a larger scale of the box VIII of FIG. 3.

DETAILED DESCRIPTION OF THE INVENTION

Figure 1:
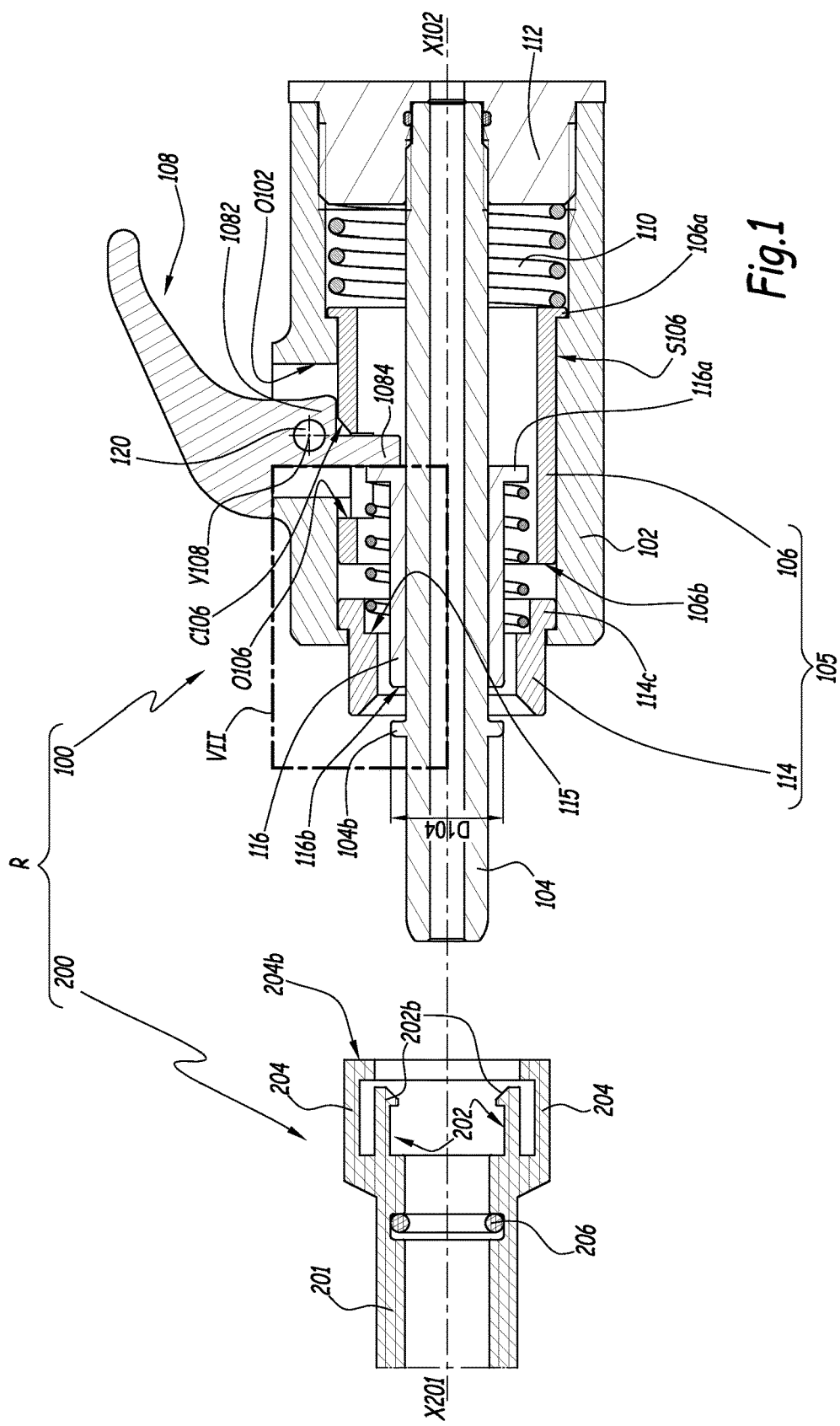
FIG. 1 is a longitudinal section of a fluidic connector according to the invention and showing a male element according to the invention and a female element, prior to coupling.

In FIG. 1 is illustrated a fluidic connector R in an uncoupled configuration. This connector R is adapted for the passage of any type of fluid, whether this is a gas or a liquid. The fluidic connector R comprises a male element 100 and a female element 200. The elements 100 and 200 are each in practice connected to a duct which is not shown for the sake of clarity of the drawing.

The male element 100 includes an outer body 102, which has an overall tubular geometry, centered on the axis X102. Except for the seal gaskets, the constitutive parts of the male element 100 are all in metal. They are further simple to manufacture, which results in an inexpensive connector R.

In the following description, a «distal», or «front» orientation of a connecting element designates an axial direction turned towards the mating connecting element, in the configuration of FIG. 1, while a «proximal», or «rear» orientation of a connecting element designates an axial direction turned oppositely with respect to the mating connecting element. For example, in the case of the male element 100, the distal direction is oriented towards the female element 200, while the proximal direction is turned oppositely with respect to the female element 200. For better localization, the elements positioned in a distal way within a connecting element have a reference followed by the letter «b», while the elements positioned in a proximal way within the connecting element have a reference followed by the letter «a».

The body 102 delimits a distal mouth 102.1 and an internal shoulder 102b positioned on the side of its distal mouth 102.1. The body 102 also delimits another internal shoulder 102a, which is positioned in a proximal way with respect to the shoulder 102b. The body 102 further comprises an aperture O102 for passage of a control member 108.

A tubular plug 104 for passage of the fluid is coaxially positioned inside the body 102 and juts out from the latter in a distal way. The plug 104 is a male plug, which includes a flange 104b for hooking up with the female element 200. As visible in FIG. 7, this flange 104b includes a face S104b for blocking claws 202 of the female element 200. This face S104b is an annular surface positioned on the proximal side of the flange 104b.

The male element 100 also comprises a «declawing» sleeve 116, which is adapted for clearing the claws 202 of the female element 200 and which is axially movable under the action of the control member 108. The sleeve 116 is coaxially positioned around the plug 104. It comprises a proximal crown 116a, with which the control member 108 cooperates, and a distal end 116b, which is adapted for cooperating with the female element 200. The sleeve 116 is axially movable around the plug 104 between a first position where it does not interact with the claws 202 and a second position, illustrated in FIG. 5, where it is able to clear the claws 202 from the flange 104. The first position is a coupling position, while the second position is an uncoupling position.

The male element 100 comprises a device 105 for locking the control member, consisting of a first portion 106 and of a second portion 114 capable of sliding inside the body 102 around the tubular plug 104.

The first portion of the locking device 105 is a ring 106 for locking the control member 108, which is coaxially positioned inside the body 102. More specifically, the ring 106 is coaxially positioned around the sleeve 116. The ring 106 is adapted so as to be axially pushed back by the female element 200, between a distal portion where it prevents maneuvering of the control member 108, and a proximal position where it does not oppose maneuvering of the control member 108 for moving the sleeve from its first to its second position. The locking ring 106 also delimits an aperture O106 for letting through the control member 108. A proximal edge of the aperture O106 includes a chamfer C106. Moreover, the locking ring 106 includes, on the proximal side, an end external peripheral crown 106a. The distal end of the locking ring is noted as 106b. The shoulder 102a of the body 102 forms an abutment shoulder for the crown 106a of the locking ring 106 in its movement towards the front, under an elastic force E110 exerted by an elastic compressive member such as a spring 110.

Figure 4:
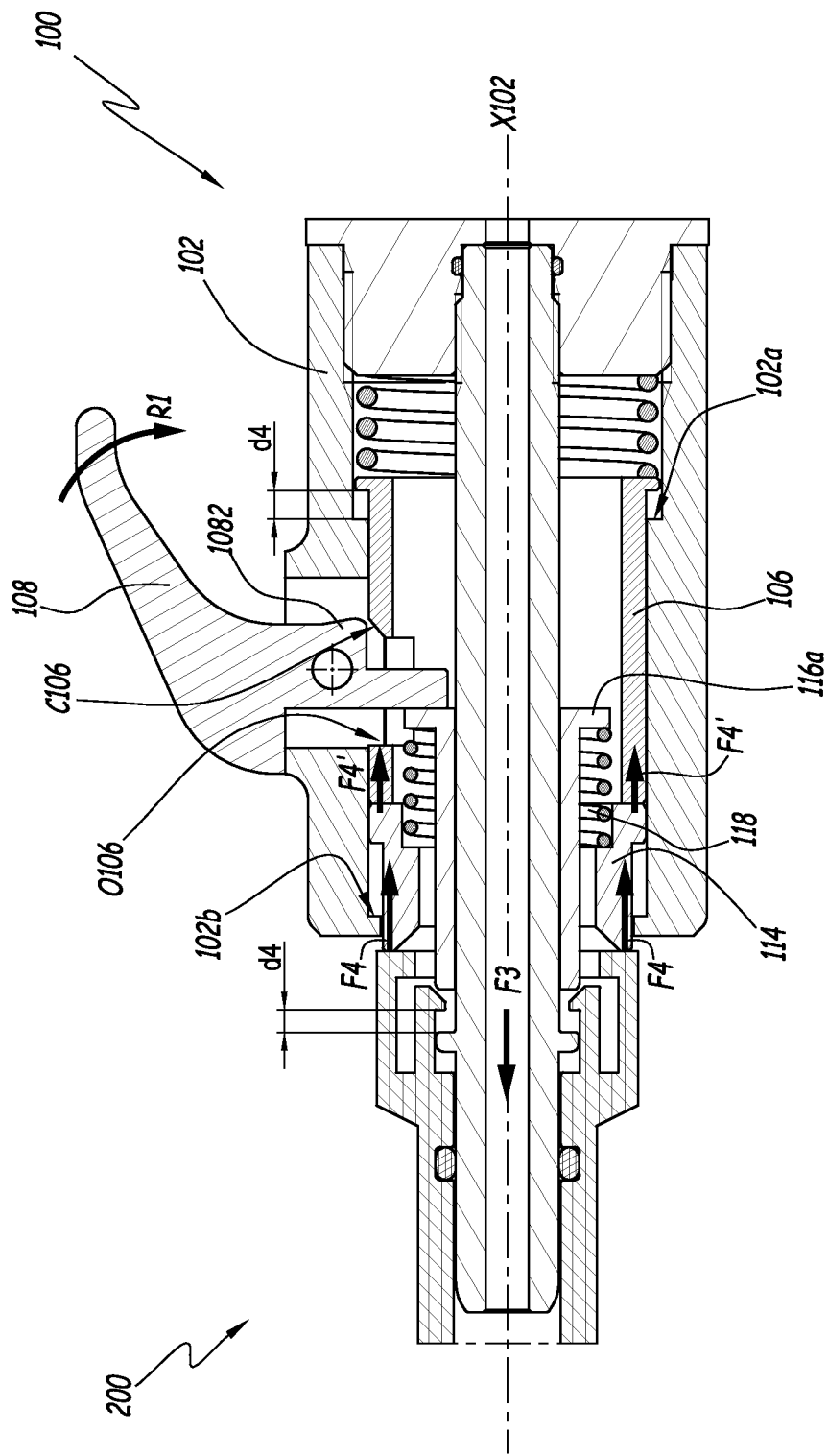
FIG. 4 is a longitudinal section of a fluidic connector according to the invention and showing the male element being inserted further into the female element.

The second portion of the locking device is a ring for probing, or a «probing» ring, 114 which is laid out coaxially around the sleeve 116 and includes a proximal end 114a, adapted for cooperating with the locking ring 106 and a distal end 114b, adapted for cooperating with the female element 200 because it is axially shifted with respect to the locking ring 106 and accessible to the female element 200 at the mouth 102.1 of the body 102. The probing ring 114 juts out from the body 102. The probing ring 114 is laid out axially on the distal side with respect to the locking ring 106 and is able to cooperate with the female element 200 in order to push back the locking ring 106 towards its proximal position. The probing ring 114 is axially movable upon contacting the female element 200 between a distal position, where it does not cooperate with the female element 200, an intermediate position where it contacts the locking ring 106, then in a distal position, and a proximal position as illustrated in FIG. 4 where it is in contact with the ring 106, itself then in a proximal position also illustrated in FIG. 4. In the intermediate and proximal positions, the proximal end 114a of the probing ring 114 is in contact with the distal end 106b of the locking ring 106 and the probing ring cooperates with the female element 200. The probing ring 114 also delimits an internal shoulder 115. Moreover, the probing ring 114 comprises a proximal external flange 114c.

In the intermediate and proximal positions, the proximal end 114a of the probing ring 114 is in contact with the distal end 106b of the locking ring 106 and the probing ring cooperates with the female element 200. The probing ring 114 also delimits an internal shoulder 115. Moreover, the probing ring 114 comprises a proximal external flange 114c.

In an uncoupled configuration, d1 designates the distance, measured in parallel with the axis X102, between the proximal end 114a of the probing ring 114 and the distal end 106b of the locking ring 106 and d3 designates the distance, measured in parallel with the axis X102, between the distal end 114b of the probing ring 114 in a distal position and the blocking face S104b of the flange 104b.

A coil spring 118 is inserted between the shoulder 115 of the probing ring 114 and the crown 116a of the sleeve 116. It therefore comprises a first turn bearing against the shoulder 115 of the probing ring 114 and a last turn bearing against the proximal crown 116a of the sleeve 116. This spring 118 is centered on the axis X102 and forms a means for elastically returning the probing ring 114 to its distal position. The spring 118 exerts an elastic force E118 both on the probing ring 114 and on the sleeve 116. The spring 118 also forms a means for elastically returning the sleeve 116 to its first position. Moreover, the probing ring 114 is stopped in its movement forwards by the contact of its flange 114c with the shoulder 102b of the body 102.

Figure 2:
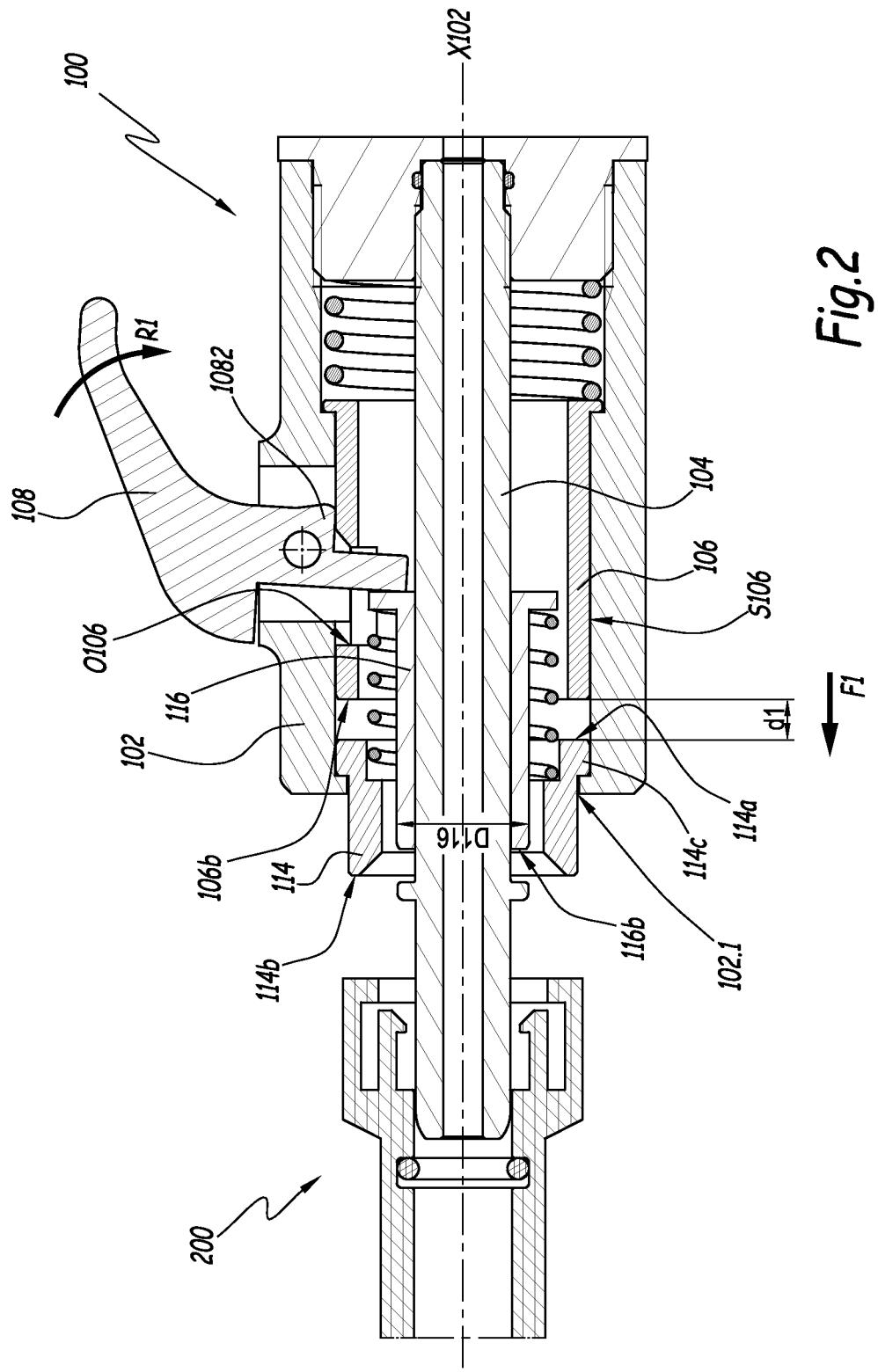
FIG. 2 is a longitudinal section of a fluidic connector according to the invention and showing a portion of the male element according to the invention being inserted into a female element.
Figure 3:
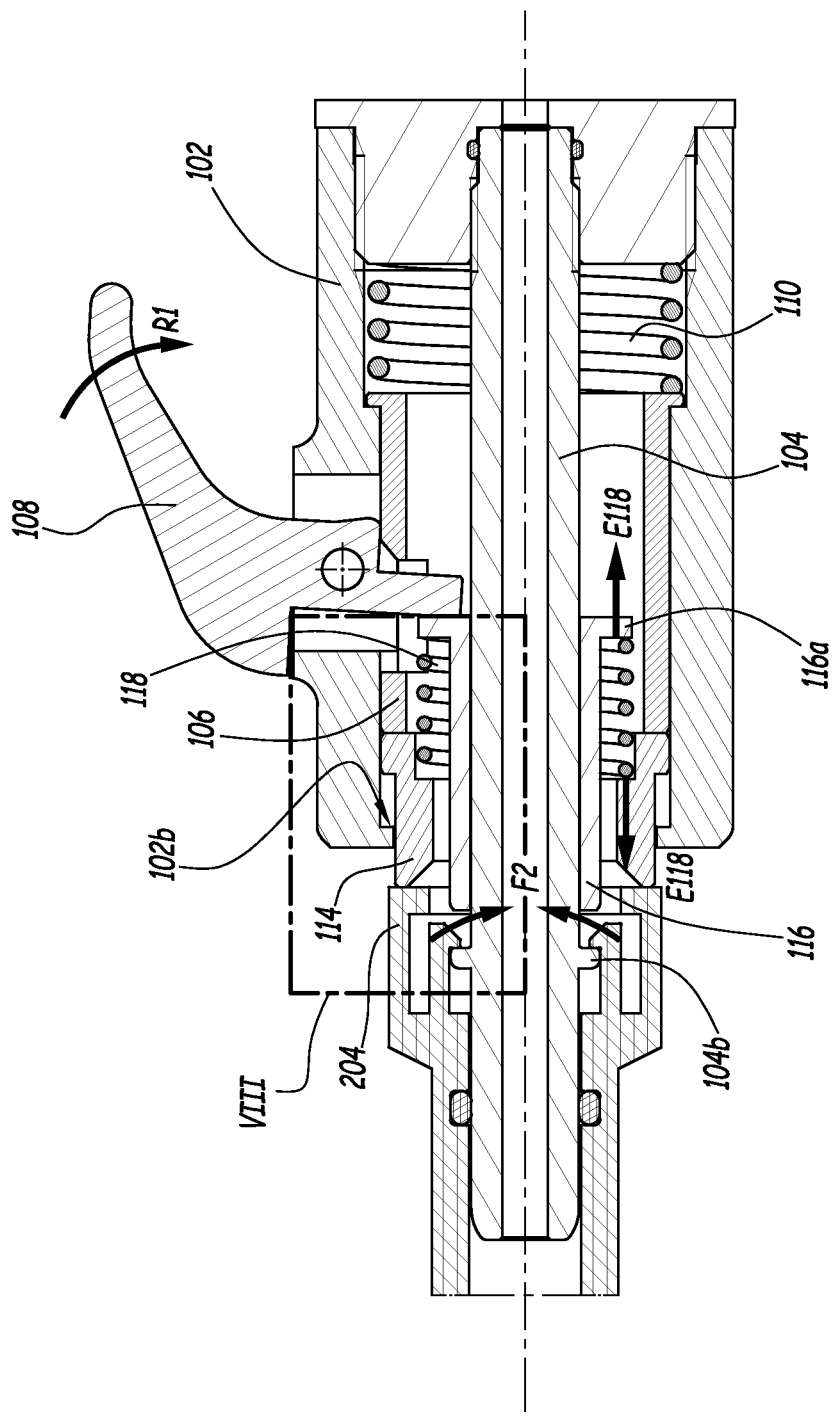
FIG. 3 is a longitudinal section of a fluidic connector according to the invention and showing the intermediate position of the male element being inserted into the female element.

The control member 108 is a lever, which is jointed around an axis Y108 and which is maneuverable with the thumb. The axis Y108 is orthoradial with respect to the axis X102. More specifically, the lever 108 is jointed around a shaft 120 mounted on the body 102, which is with a circular section and which is centered on the axis Y108. The lever 108 comprises a finger 1084 for pushing the sleeve 116. This finger 1084 extends through the aperture O106 of the locking ring 106 and bears against the proximal crown 116a of the sleeve 116. The lever 108 also includes a heel 1082 for blocking the pivoting of the lever 108, which abuts against the locking ring 106 when the latter is in a distal position as illustrated in FIG. 2. More specifically, the heel 1082 abuts against the outer radial surface S106 of the locking ring 106. The heel 1082 is of a square shape, with a rounded fillet.

Figure 5:
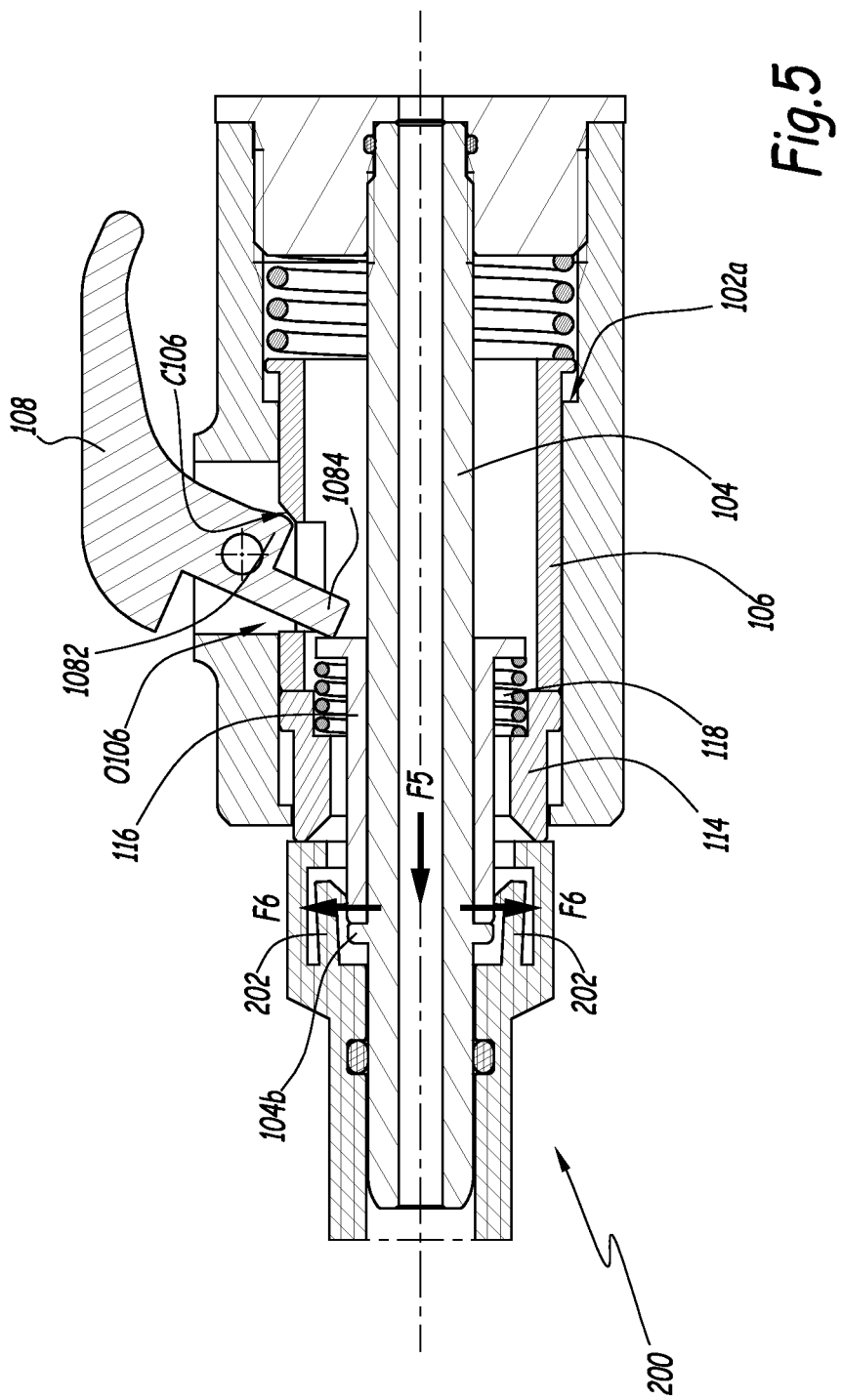
FIG. 5 is a longitudinal section of a fluidic connector according to the invention and showing a male element according to the invention inserted into a female element and showing movement of the lever.
Figure 6:
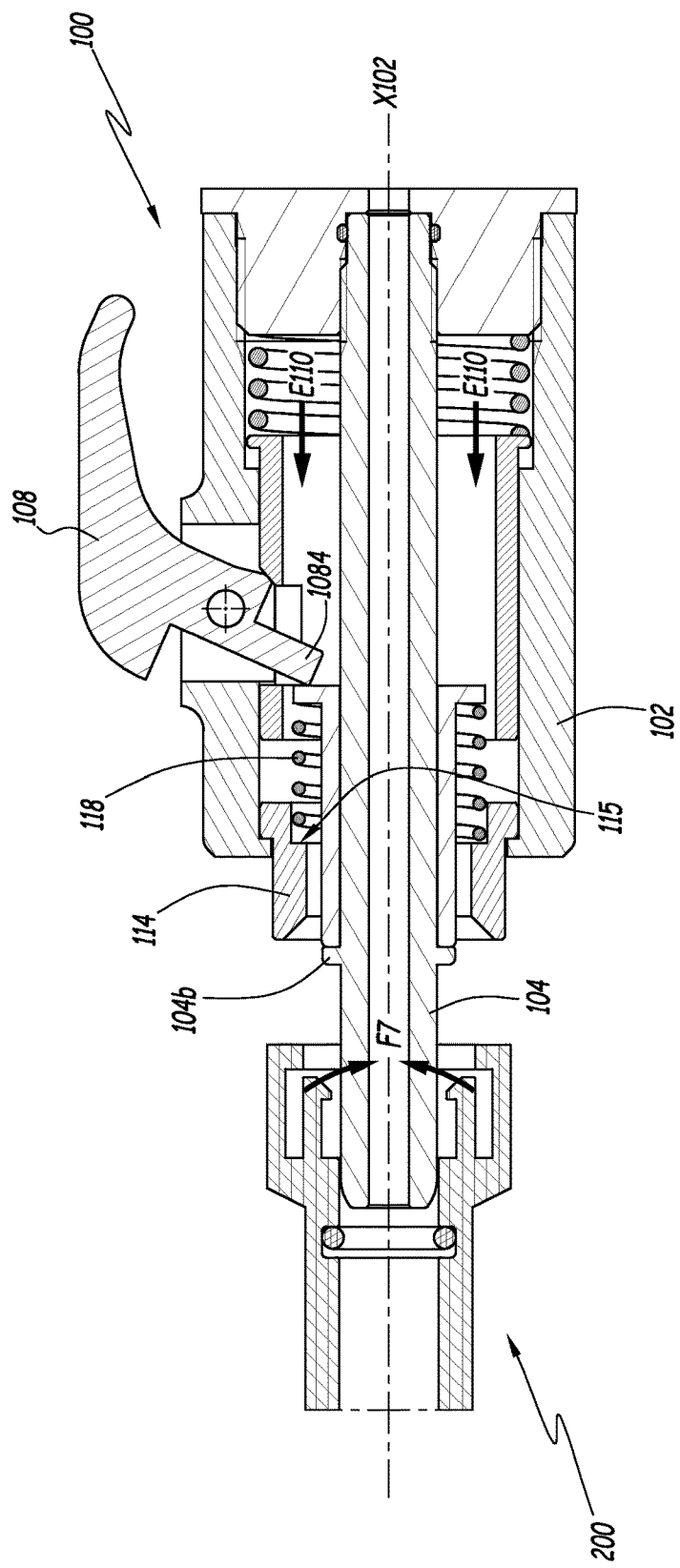
FIG. 6 is a longitudinal section of a fluidic connector according to the invention and showing a male element according to the invention during removal from a female element.

The lever 108 may be pivoted between a raised configuration, illustrated in FIGS. 1 to 4 and a lowered configuration, illustrated in FIGS. 5 and 6.

The spring 110 is a spring for returning the locking ring 106 into its distal position. It is inserted between the proximal crown 106a of the locking ring 106 and a part 112 for centering the plug 104 in the body 102, this centering part 112 being positioned in a proximal way in the male element 100. The centering part 112 delimits a housing for receiving the plug 104. The spring 110 is a coil spring centered on the axis X102. It comprises a first turn bearing against the crown 106a and a last turn bearing against the part 112. It exerts an elastic force E110 on the locking ring 106.

Figure 9:
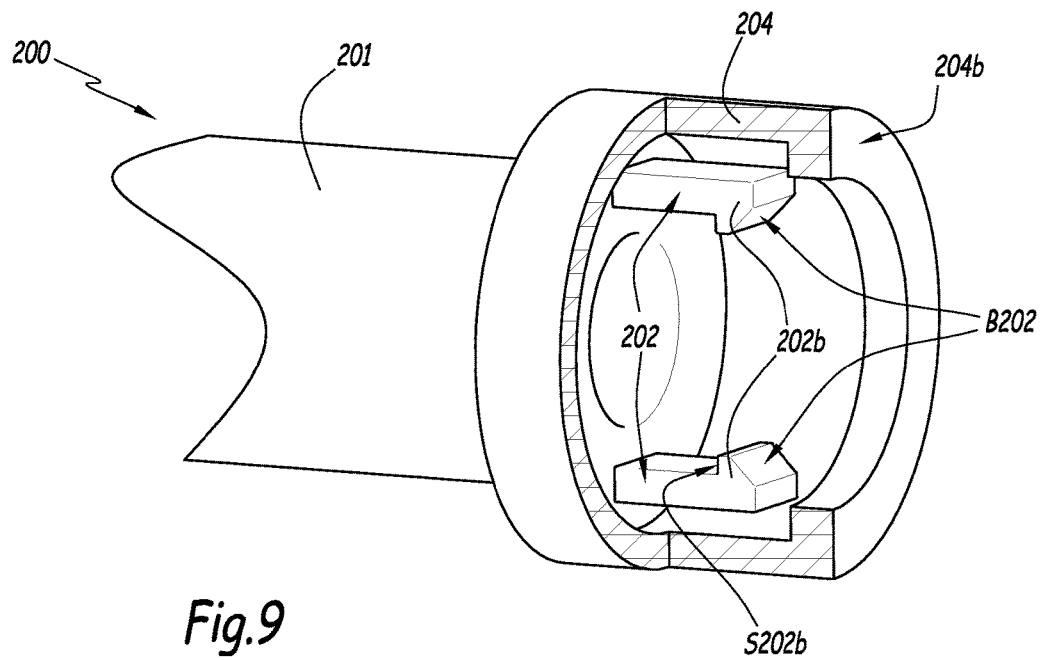
FIG. 9 is a perspective view of a female element of the fluidic connector of FIGS. 1 to 8, illustrated with a half-section portion for better viewing.

The female element 200 is globally tubular and centered on an axis X201. The female element 200 is an end piece in plastic material. It includes a tubular body 201 and two elastic claws 202 which extend in a distal way with respect to the body 201. The claws 202 comprise a distal end portion 202b which protrudes radially inside the body 201. This end portion 202b is adapted so as to hook up on the flange 104b of the male plug 104. As better visible in FIG. 9, the end portion 202b of the claws 202 includes a proximal hooking-up surface S202b with the blocking face S104b of the flange 104b. Moreover, the surface S202b of each claw 202 extends in a plane perpendicular to the axis X201 when the claw 202 is not deformed, notably in the configurations illustrated in FIGS. 1 to 9. The end portion 202b of the claws 202 included a beveled edge B202, intended to come into contact with the flange 104b upon coupling. This beveled edge allows elastic deformation of the claws 202 in order to surmount the flange 104b during the coupling. The female element 200 also comprises a pusher 204, which is tubular and which surrounds the elastic claws 202. This pusher 204 comprises a distal surface 204b for pushing the distal end 114b of the second portion 114 of the locking device, which is a probing ring 114.

d2 designates the distance, measured in parallel with axis X201, between the hooking-up surface S202b of the claws 202 and the pushing surface 204b belonging to the pusher 204. The female element 200 moreover comprises a seal O-ring 206, which is positioned in an internal peripheral groove of the body 201. The body 201, the pusher 204 and the claws 202 are in one piece.

In order to couple the connector R, first of all the elements 100 and 200 should be placed facing each other by aligning the axes X201 and X102.

Next, a portion of the male element 100 should be inserted into the female element 200. This movement is illustrated in FIG. 2 by an arrow F1. As visible in this Figure, it is impossible to swing the lever 108 in this configuration since the maneuver R1 for swinging the lever 108 is prevented by the heel 1082 which abuts against the outer surface S106 of the locking ring 106.

When the male element 100 is brought further closer to the female element 200, the probing ring 114 is pushed back axially towards the rear, against the elastic force of the spring 118. In other words, the spring 118 is compressed against the proximal crown 116a of the sleeve 116. The probing ring 114 is axially movable with respect to the body 102 and therefore passes from its distal position illustrated in FIG. 2 to its intermediate position illustrated in FIG. 3, where its proximal end 114a is in contact with the distal end 106b of the locking ring 106, without driving it. The travel of the ring 114 between both of these positions corresponds to dead travel since it does not cause any displacement of the locking ring 106. This dead travel has a length equal to the distance d1.

In parallel, the claws 202 of the female element 200 are elastically deformed outwards, along a globally radial direction to the axis X201 and centrifugal, in contact with the flange 104b of the plug 104. As soon as the end portion 202b of the claws 202 has passed the flange 104b, the claws 202 resume their initial shape by elastic return, as illustrated by the arrows F2 in FIG. 3. The hooking-up surface S202b of the claws 202 will then be engaged on the blocking face S104b of the flange 104b, which prevents removal of the male element 100 out of the female element 200. The connector R is then found in the coupled configuration illustrated in FIG. 3.

The distance d2 between the hooking-up surface S202b and the pushing face 204b of the pusher 204 is less than or equal to the distance d1 separating the probing ring 114 and the locking ring 106 in the uncoupled configuration of the connector R. As mentioned above, this distance d1 corresponds to the travel of the probing ring 114 between its distal position and its intermediate position. The female element 200 is therefore designed so that the probing ring 114 at most makes up for its play d1 with the locking ring 106 upon coupling. In the relevant example, d1 is equal to d2 so that the probing ring 114 makes up for its play d1 with the locking ring 106 upon coupling, without however displacing the ring 106. The coupling of the male element 100 with the female element 200 therefore does not cause any displacement of the locking ring 106 towards the rear and the risk that the locking ring 106 is maintained in a proximal position in the coupled configuration and therefore does never oppose the maneuvering by a of the lever, is set aside. This therefore guarantees the safety of the connection of the connector R.

Moreover, the male plug 104 is inserted into the body 201 beyond the seal gasket 206, so as to achieve a sealed fluidic connection of the male and female ducts.

In order to uncouple the connector R, the female element 200 should be moved closer to the male element 100, i.e. the plug 104 should be engaged more deeply into the body 201, by a predefined distance d4. For this, the operator has to push the male element 100 further inside the female element 200, as illustrated by the arrow F3 in FIG. 4. This additional displacement F3 implies that the claws 202 of the female element 200 separate, or move away axially from the blocking face S104b of the flange 104b. This additional displacement F3 of the male element 100 also induces that the female element 200 pushes the probing ring 114 which, in turn pushes the locking ring 106 towards the rear, as illustrated by the arrows F4 and F4' in FIG. 4. The probing ring 114 therefore passes from its intermediate position to its proximal position, against the elastic force E118 of the spring 118 and the locking ring 106 passes from its distal position to its proximal position, against the elastic force E110 of the spring 110. The operator has to maintain the female element 200 on the front, in order to prevent elastic return of the locking ring 106. In the proximal position, the aperture O106 is radially facing the aperture O102 for letting through the lever 108, and in which the heel 1082 is no longer bearing against the outer surface S106 of the ring 106. The aperture O106 is therefore sufficiently wide and sufficiently moved back with respect to the aperture O102 for letting through the heel 1082.

The travel of the ring 106 between its distal position and its proximal position and the travel of the probing ring 114 between its intermediate position and its proximal position are therefore equal to the distance d4 of their moving close to each other, required for releasing the lever 108. When the ring 106 reaches its proximal position, it is possible to swing the lever 108 without having the heel 1082 abutting against the external surface S106 of the locking ring 106, as illustrated by the arrow R2 in FIG. 4. The locking ring 106 prevents activation of the lever 108 as long as the elements 100 and 200 have not been brought closer by the distance d4, which depends on the positioning of the aperture O106 and on the shape of the lever 108, in other words as long as the flange 104b of the plug 104 has not been sufficiently moved away in the body 201 with respect to the claws 202. The pivoting movement R2 of the lever 108 around the axis Y108 is facilitated by the presence of a chamfer C106 delimited on the proximal edge of the aperture O106 and by the rounded fillet of the heel 1082. It is therefore indispensable to move the male element and the female element of the connector closer to each other in order to allow maneuvering of the control member.

The pivoting R2 of the lever 108 is carried out between its raised configuration and its lowered configuration and causes the finger 1084 to push the «declawing» sleeve 116 in its second position, as illustrated by the arrow F5 in FIG. 5. In the raised configuration of the lever 108, the sleeve 116 is found in its first position while in the lowered configuration of the lever 108, the «declawing» sleeve 116 is found in its second position.

The forward movement F5 of the sleeve 116 is accomplished against the elastic action E118 of the spring 118. In other words, the spring 118 is compressed during the forward displacement of the sleeve 116. The distal end 116b of the sleeve 116 is driven towards the flange 104b during pivoting R2 of the lever 108 and clears the claws 202 of the female element 200 outwards, notably in a globally centrifugal way, as illustrated by the arrows F6 in FIG. 5. Indeed, the beveled edges B202 of the claws 202 are oriented so that the pushing of the distal end 116b of the sleeve 116 on the edges B202 causes elastic deformation along a centrifugal global direction. As explained earlier, when the claws 202 are disengaged outwards, they are maintained separate from each other and from the flange 104b by the distance d4, which advantageously allows the hooking-up surface S202b of the claws 202 to not rub against the blocking face S104b of the flange 104b. This further allows the sleeve 116 not to crush the claws 202 against the flange 104b during its displacement between its first and its second position. Therefore there is no risk of crushing or tearing off the claws 202 upon uncoupling and the wear of the claws 202 during the successive connection and disconnection operations is reduced. The distal end 116b will finally abut upon the flange 104b. The claws 202 are disengaged and the contact between the sleeve 110 and the flange 104b is maintained so that the male element may be removed without any risk of the blocking face S104b of the flange 104b catching the claws upon disconnection.

During the removal of the male element 100 out of the female element 200, the claws 202 resume their initial shape by elastic return, as illustrated by the arrows F7 in FIG. 6.

Moreover, the distance d2 between the hooking-up surface S202b and the pushing surface 204b is greater than the distance d3, measured in parallel with the central axis X102, between the contact surface 114b of the probing ring 114 in a distal position with the female element 200 and the blocking face S104b belonging to the flange 104b. Thus, the uncoupling movement of the fluidic connector R is accompanied by pushing of the probing ring 114 against the pusher 204 of the female element 200 since the probing ring 114 is subject to the elastic force of the spring 118 towards the front, i.e. towards the female element 200. The probing ring 114 therefore passes from its proximal position to its distal position. The travel of the ring 114 between both of these positions is equal to the value of the over travel d4 required for releasing the lever 108, plus the dead travel d1. The dead travel d1 allows ejection of the female element 200 under the elastic force of the spring 118. In other words, upon uncoupling, the female element 200 is automatically moved away from the male element 100 by a distance corresponding to the length d1 of the dead travel. The operator therefore does not need to pull on the male element 100 for disengaging the claws 202 from the flange 104b, which are automatically moved to a distance away from the blocking face of the flange without any risk of involuntary connection of the connector upon releasing the lever. The disengagement force of the claws 202 is controlled by the stiffness of the spring 118. This allows uncoupling of the connector R without damaging the elastic claws 202 and automatically.

The outer diameter of the sleeve 116 is greater than the outer diameter D104 of the flange 104b, so that removal of the male element 100 out of the female element 200 is accomplished without hooking up of the claws 202 to the flange 104b. Therefore there is no risk of crushing the elastic claws 202 upon contact with the flange 104b during the disconnection maneuver.

Once the connector R is uncoupled, the operator releases the pressure on the lever 108, which then automatically moves up again by elastic return of the sleeve 116 towards its first position, under the elastic force E118 of the spring 118. Also, the ring 106 comes back into the distal position under the elastic force E110 of the spring 110.

Figure 10:
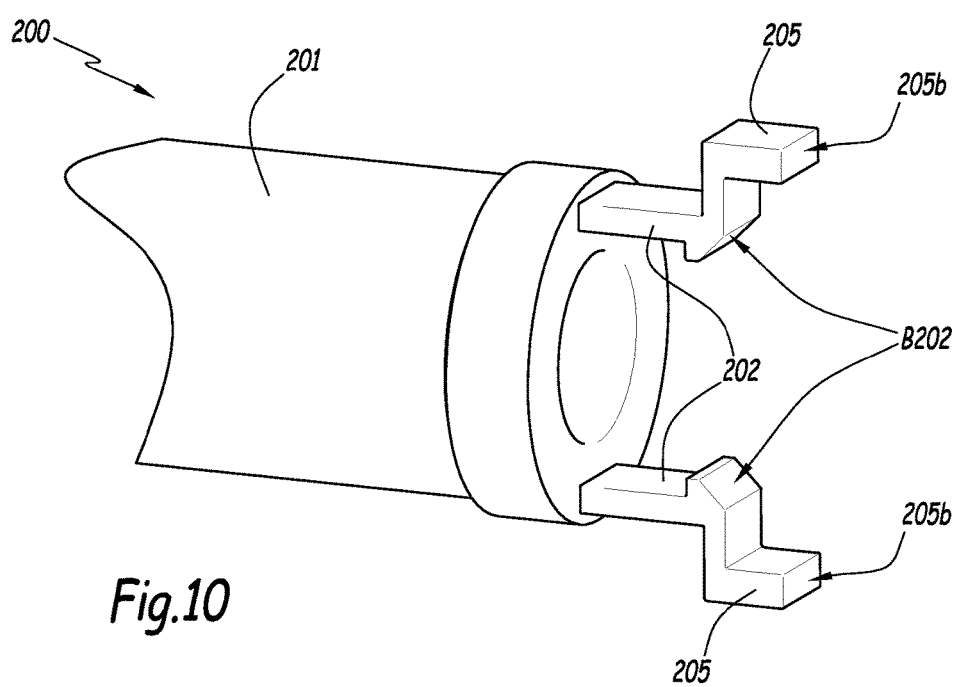
FIG. 10 is a perspective view, similar to FIG. 9, of an alternative construction of the female element of the connector of FIGS. 1 to 6.

In FIG. 10, is illustrated an alternative construction of a female element 200. The female element 200 of FIG. 10 differs from that of FIG. 9 in that it does not comprise any tubular pusher but tabs 205 for pushing the probing ring 114. These pushing tabs 205 are supported by the claws 202 and are bent. They include a pushing face 205b, which is provided for coming into contact with the distal end 114b of the probing ring 114. The construction of the male element and the operation of the connector upon coupling and uncoupling remain similar to what was described earlier.

Figure 11:
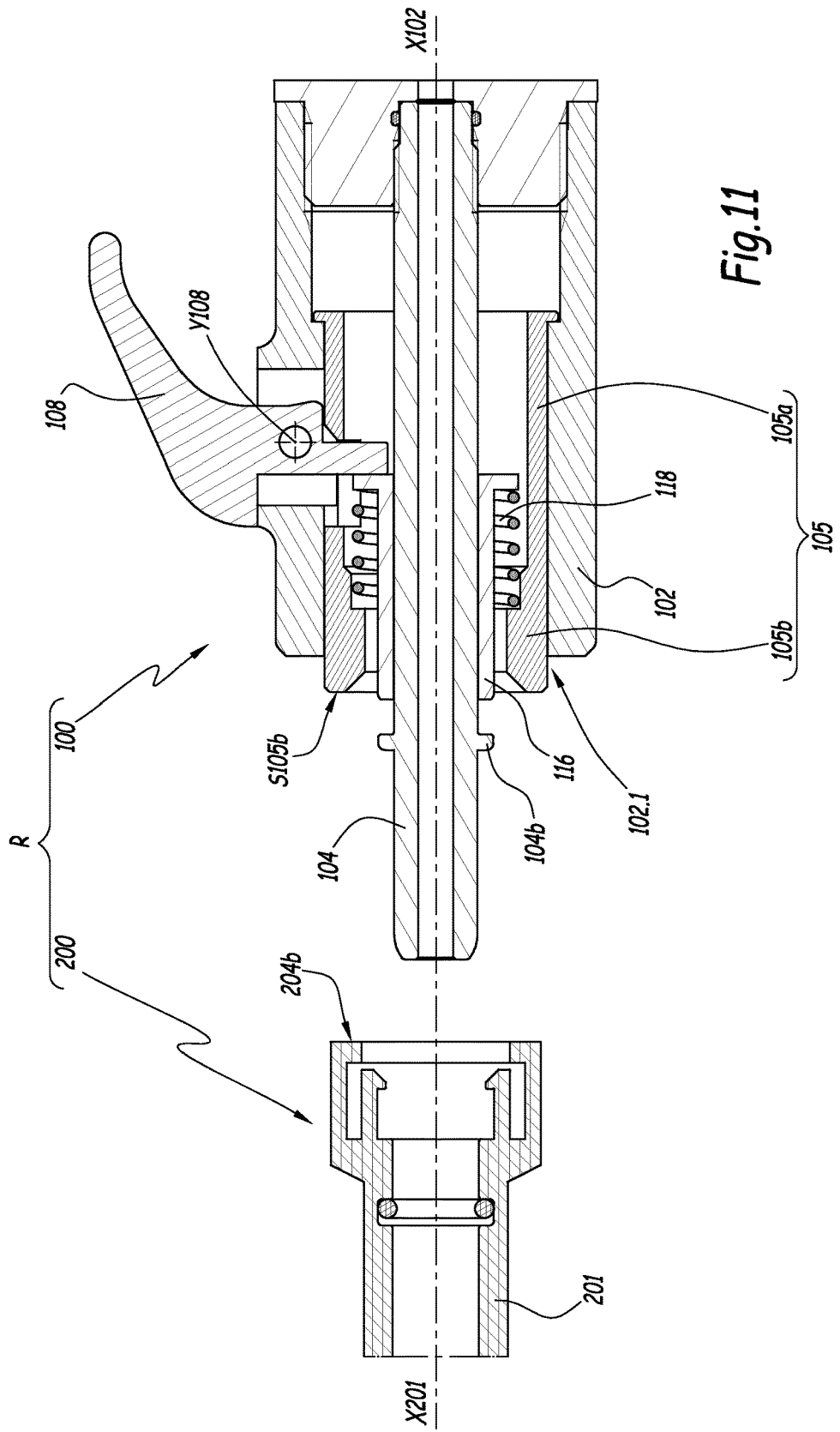
FIG. 11 is longitudinal section respectively similar to FIGS. 1 and 5, which represent a fluidic connector showing a male element according to a second embodiment of the invention, prior to coupling with the female element.
Figure 12:
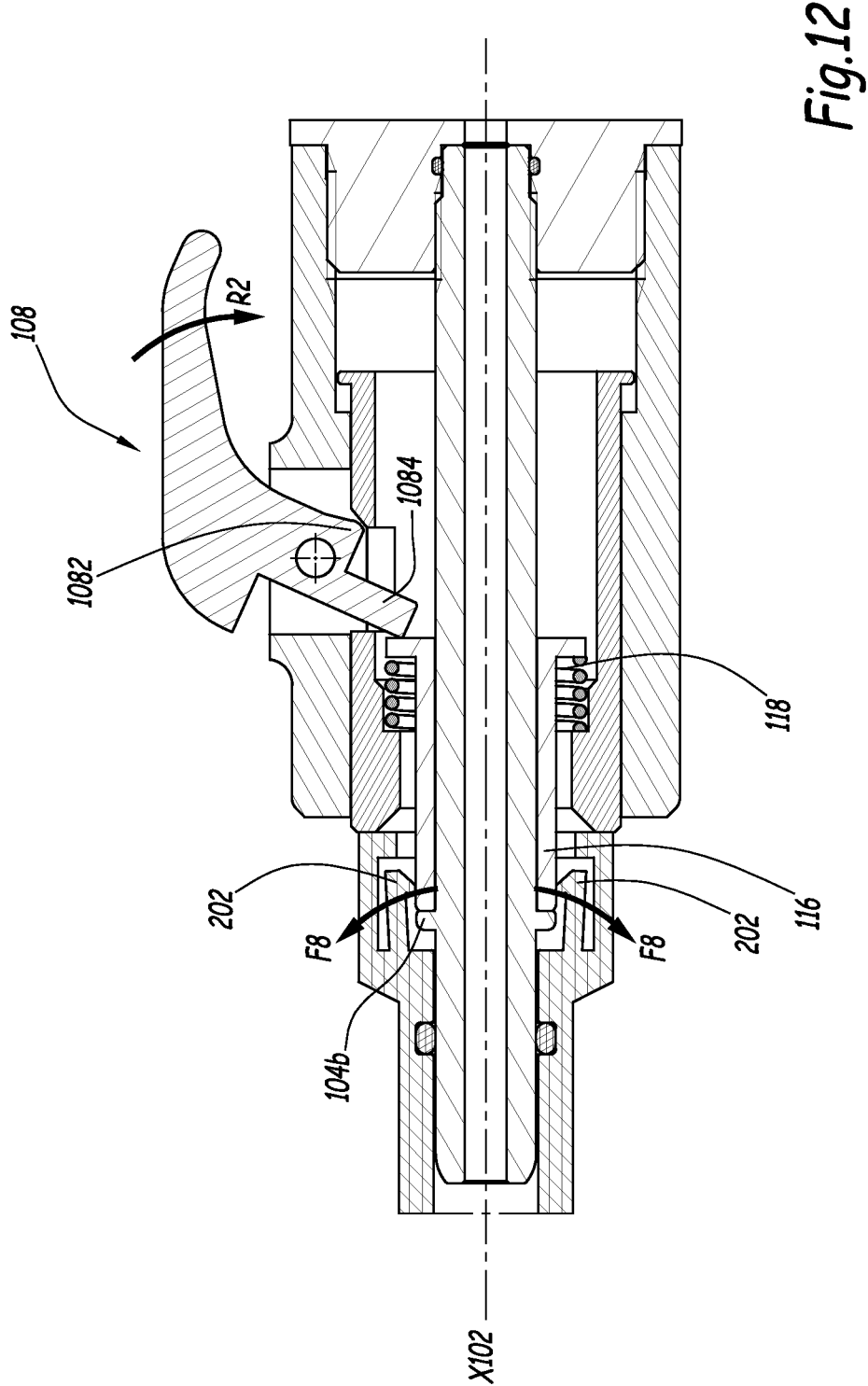
FIG. 12 is longitudinal section respectively similar to FIGS. 1 and 5, which represent a fluidic connector showing a male element according to a second embodiment of the invention inserted into female element, and FIG. 13 are longitudinal sections which represent a first uncoupling step for a fluidic connector including a male element according to a third embodiment of the invention, FIG. 14 are longitudinal sections which represent a second uncoupling step for a fluidic connector including a male element according to a third embodiment of the invention, FIG. 15 are longitudinal sections which represent a third uncoupling step for a fluidic connector including a male element according to a third embodiment of the invention.

In FIGS. 11 and 12 is illustrated a second embodiment of a male element 100 belonging to fluidic connector. In this second embodiment, the identical elements as compared with the first embodiment retain their numerical references, while the elements which differ from that of the first embodiment bear other numerical references. The fluidic connector of this embodiment globally operates like the one of FIGS. 1 to 9.

The male element 100 of FIGS. 11 and 12 differs from that of FIGS. 1 to 6 in that the probing ring and the locking ring are in one piece and form a same locking device 105. This one-piece locking device 105 comprises a first portion 105a, which, in a distal position illustrated in FIG. 11, prevents maneuvering of the control member 108 and a second portion 105b, a so called proximal portion, accessible to the female element 200 through the distal mouth 102.1 of the body 102. During coupling, the distal end surface S105b of the device 105 is therefore axially pushed back towards the rear directed by the female element 200 and against the elastic force E118 exerted by the spring 118. Uncoupling is carried out in a similar way to the first embodiment, i.e. the female element 200 has to be brought a little closer to the male element 100 in order to be able to swing the lever 108 and advance the «declawing» sleeve 116. The sleeve 116 then separates the claws 202 outwards, as illustrated by the arrows F8 in FIG. 12. The operator may then remove the male element 100 from the female element 200 without any risk of catching the claws 202 with the flange 104b. The elastic return of the device 105 in a distal position is carried out under the effect of the force E118 of the spring 118. Therefore there is no need to provide an additional spring at the rear of the male element 100, like in the first embodiment. The construction of the connector of FIGS. 11 and 12 is therefore simpler.

As described above, the uncoupling of the connector R according to the first or to the second embodiment is preceded by a step consisting of further driving in the male element 100 into the female element 200, notably according to a distance d4, in order to move the device 105 sufficiently axially back to the rear so as to be able to maneuver the control member 108. Indeed, the aperture O106 made in the device 105 has to be at the same level as the control member 108 so that the latter is maneuverable. Now, if the claws 202 are too short, the user risks not being able to attain this distance d4 required for unlocking since the flange 104b would abut against the female element 200 and would thereby oppose the movement for driving the male element 100 into the female element 200.

Figure 13:
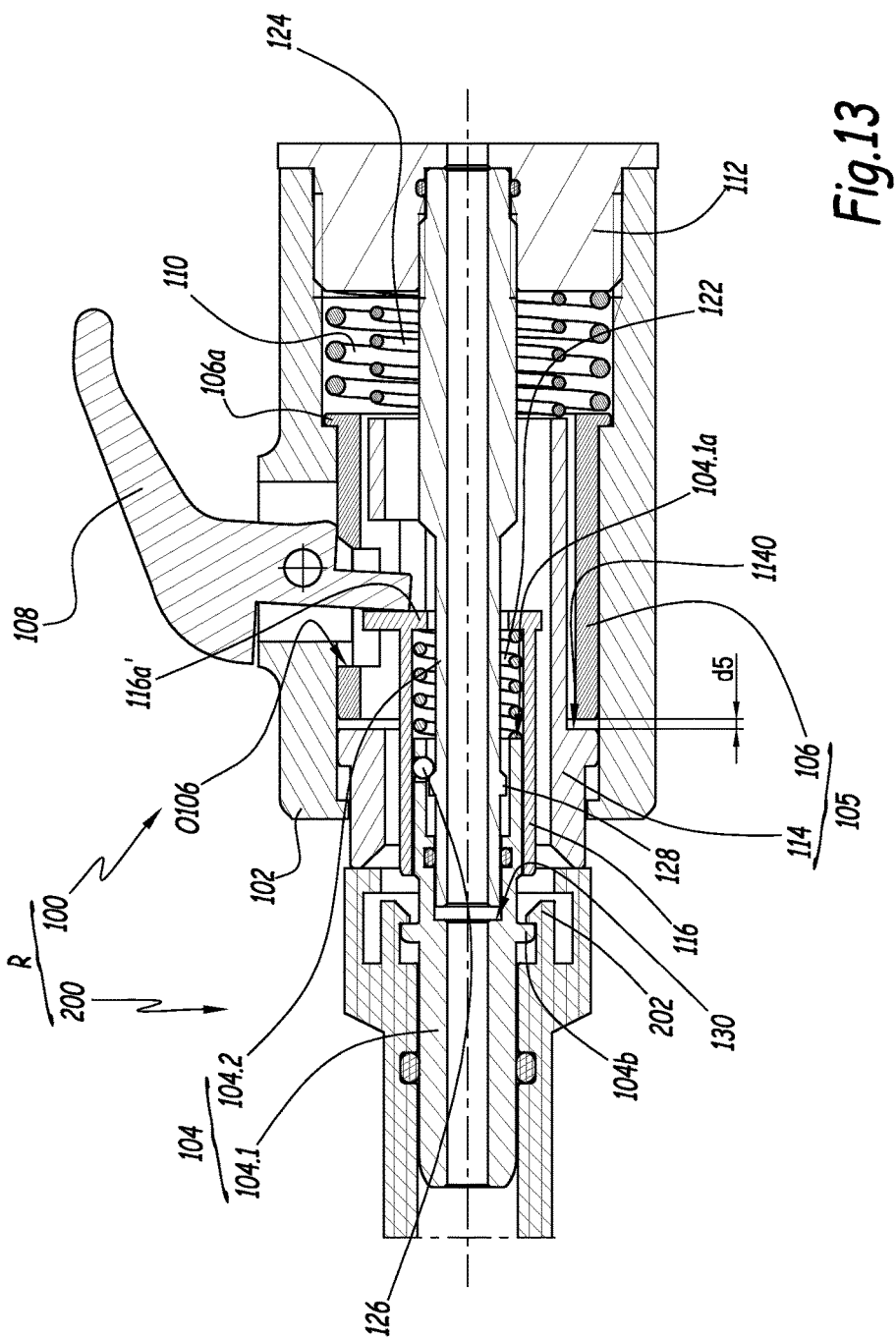
Figure 14:
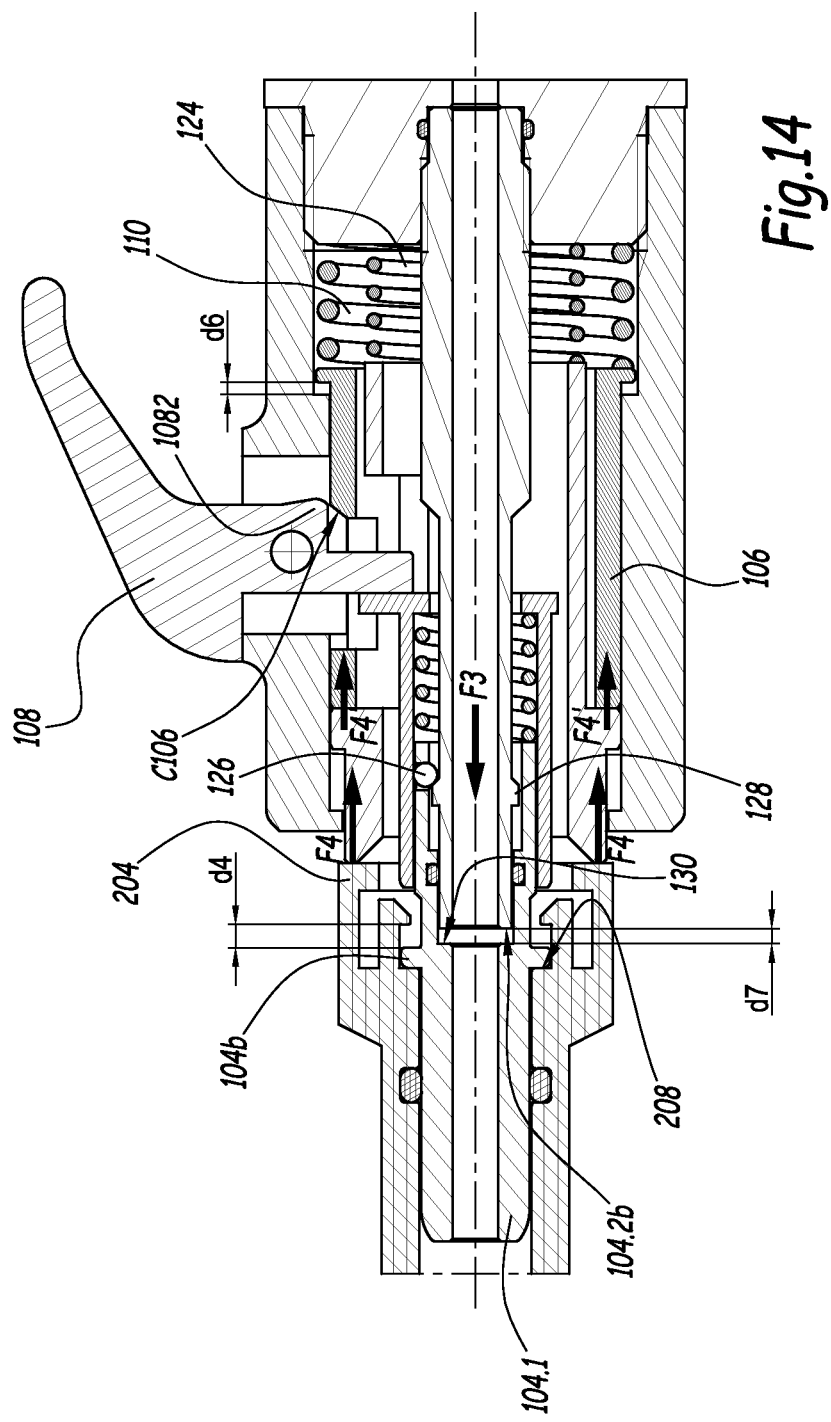
Figure 15:
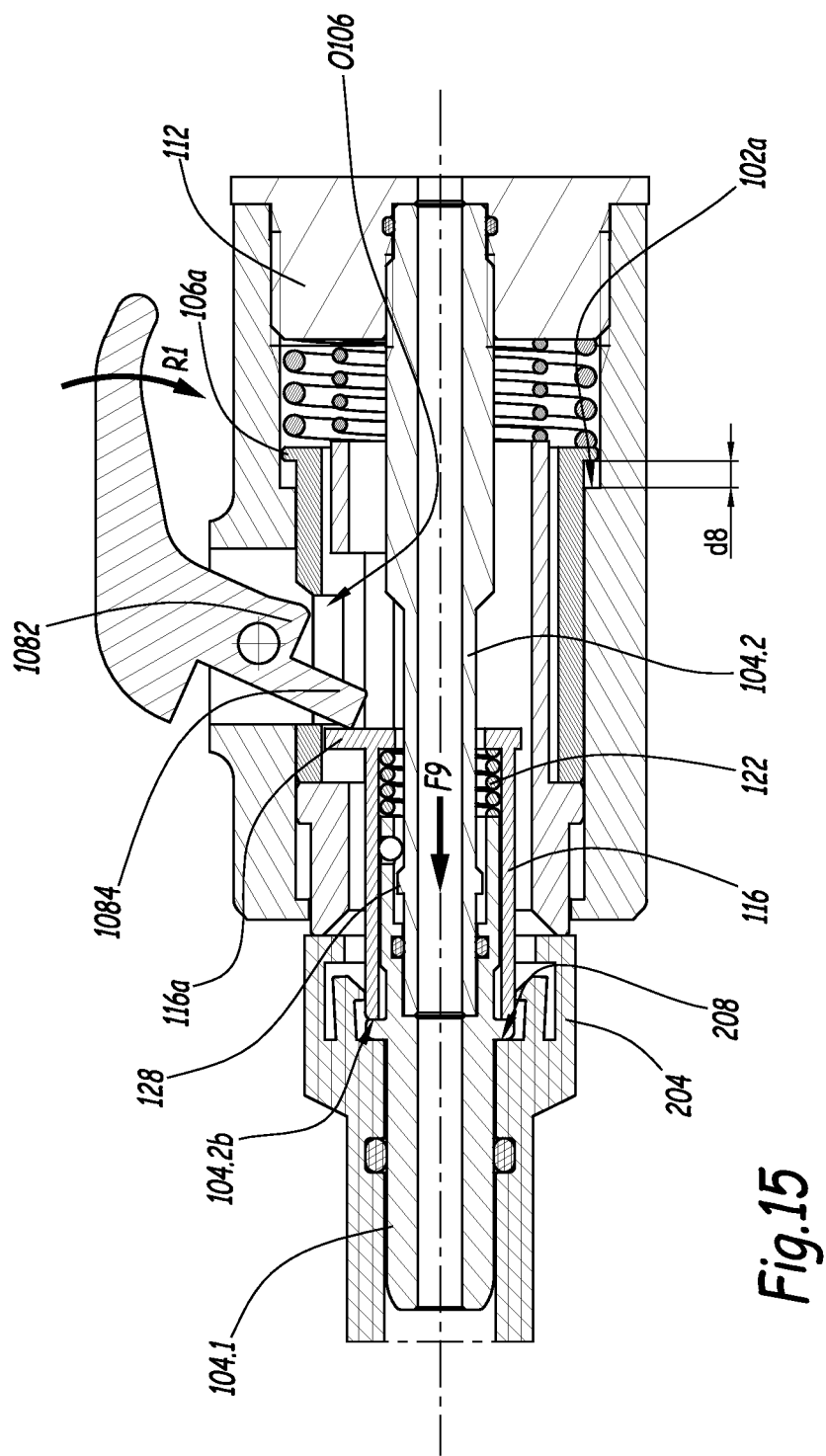

It is at this possible limitation where the intention is to find a remedy to the male element 100 according to a third embodiment, which is illustrated in FIGS. 13 to 15. This male element 100 is therefore provided for cooperating with a female element 200 with short claws. In this third embodiment, the identical elements with respect to the first or second embodiment retain their numerical references, while the elements which differ from those of the first two embodiments bear other numerical references. The fluidic connector of this embodiment globally operates like the one of FIGS. 1 to 12.

The male element 100 according to the third embodiment includes a tubular plug 104 which has two parts. The plug 104 actually comprises a proximal portion 104.2 and a distal portion 104.1 which is partly fitted in around the proximal portion 104.2. The proximal portion 104.2 of the plug 104 is secured to the centering part 112, itself attached to the body 102. The distal portion 104.1 is axially movable relatively to the proximal portion 104.2, between an advanced position and a set-back position. It is therefore movable relatively to the body 102, and bears the flange 104b. Its mobility allows it to be moved closer to the body 102. It is radially interposed between the proximal portion 104.2 of the plug and the sleeve 116.

The male element 100 comprises blocking means in a configuration for bringing both portions of the plug 104 to as close as possible. In other words, these means prevent both portions 104.1 and 104.2 of the plug 104 from moving closer together beyond a certain travel. These means comprise an internal shoulder 130, which reduces the diameter of the internal ball of the distal portion 104.1 upon moving forwards. This internal shoulder 130 opposes the axial moving of the portions 104.1 and 104.2 closer together when it abuts against a distal end face 104.2b of the proximal portion 104.2 of the plug 104. Therefore there exists a possibility of a relative axial movement between the portions 104.1 and 104.2. The amplitude of this movement corresponds to the axial play d7 between the shoulder 130 of the portion 104.1 and the distal end face 104.2b of the portion 104.2 when the ball 126 is abutting against an overthickness 128. This is referred to as a retractable or telescopic plug.

The male element 100 comprises an abutment member 126 for stopping the distal portion 104.1 of the plug 104 in advanced position, which is a configuration with maximum separation, this maximum separation corresponding to the axial play d7, i.e. to the separation distance between the advanced position and the set-back position of the distal portion 104.1. This member comprises at least one ball stop 126, which is received in a housing of the distal portion 104.1. This housing is a radial aperture with a dimension mating the diameter of the ball stop 126, which may optionally allow axial play of the ball in its housing. The ball stop 126 protrudes radially inwards with respect to the ball of the distal portion 104.1 and cooperates with an over thickness 128 made on an external surface of the proximal portion 104.2. In its advanced position, the distal position 104.1 of the plug is in abutment against the ball 126, which is itself in abutment against the proximal portion 104.2 of plug 104. More specifically, the ball 126 prevents the portions 104.1 and 104.2 from moving axially away from each other when it abuts against the over thickness 128. The ball 126 is therefore positioned at the rear of the overthickness 128. It may be noted that this over thickness 128 is visible on the periphery of the plug and a stop flange.

The male element 100 further comprises a means for returning the distal portion 104.1 into an advanced position i.e. in a position where the ball 126 is abutting against the overthickness 128 on the one hand and on the other hand from the sleeve 116 in its first position, i.e. in a coupling position. This return means comprises a coil spring 122 inserted between a proximal end face 104.1a of the portion 104.1 and an internal shoulder 116a' belonging to the «declawing» sleeve 116. More specifically, this shoulder 116a' is positioned at the proximal end of the sleeve 116. The spring 122 therefore allows both portions 104.1 and 104.2 of the plug 104 to be maintained away from each other.

In a similar way to the first embodiment, the male element 100 includes a device 105 for locking the control member 108, including a locking ring 106 able to slide inside the body 102 around the tubular plug 104 between a distal position where it prevents maneuvering of the control member 108, and a proximal position where it does not oppose maneuvering of the control member 108 for displacing the sleeve 116 from its first to its second position.

The device 105 also comprises a probing ring 114 which is able to slide inside the body around the tubular plug 104 between a distal position of the ring 106 and a proximal position of the ring 106. It further has an end 114b accessible to the distal mouth of the body 102. Unlike the first embodiment, the ring 114 extends towards the rear, inside the ring 106. The ring 114 comprises a shoulder 1140 adapted so as to abut against the distal end face of the ring 106 when the ring 114 is moved back. This ring 114 is therefore able to drive the locking ring 106 of the device 105 from its distal position to its proximal position. Further, the male element 100 comprises means for returning the ring 114 into a distal position. These return means comprise a coil spring 124 inserted between a proximal end face of the ring 114 and the centering part 112. The ring 114 finally delimits an aperture, radially aligned with that of the locking ring 106, for letting through the control member 108. The aperture of the ring 114 is sufficiently wide so that the ring 114 thus never forms an obstacle to the swinging of the control member 108.

The operation upon coupling the connector R equipped with the male element 100 according to the third embodiment is identical with that of the connector R comprising the male element 100 according to the first embodiment. Thus, only the steps corresponding to uncoupling of the connector R are described below for the sake of brevity.

Unlike the connector R described in FIGS. 1 to 9, during the coupling phase, the probing ring 114 of the male element 100 according to the third embodiment does not make up for the axial play d1 existing between the locking ring 106 in the uncoupled configuration. Indeed, the pusher 204 is here shorter than the one of the female element 200 described in FIGS. 1 to 10. In the coupled configuration, there is therefore an axial play d5 between a distal end face of the ring 106 and the shoulder of the probing ring 114.

In order to uncouple the connector R, the user begins by driving the male element 100 further into the inside of the female element 200, as illustrated by arrow F3 in FIG. 14. The pusher 204 then pushes the ring 114 into contact with the locking ring 106. This in a first phase gives the possibility of making up for the axial play d5, and, in a second phase pushing the ring 106 towards the rear. The prongs 202 are axially disengaged from the flange 104b of the plug 104. As the claws 202 are short, the flange 104b will rapidly be in contact with a shoulder 208 of the female element. This configuration is illustrated in FIG. 14. In this configuration, the play d5 was caught up and the ring 106 was moved back by a distance d6 but it is not sufficiently moved back so as to let through the heel 1082 of the maneuvering member 108. In other words, in this contact position of the shoulder 208 with the flange 104b, the play d6 between the proximal peripheral crown 106a of the ring 106 and the shoulder 102a of the body 102 is not sufficient so as to be able to swing the lever 108 and control the displacement of the sleeve 116. Under the assumption that the male element 100 according to the first embodiment would be used with the female element 200 of FIGS. 13 to 15, the first portion 106 of the locking device 105 would not attain a sufficiently proximal position: the maneuver of the control member 108 would then be impossible and the connector would remain blocked in the coupled position.

However, with the connector R of FIGS. 13 to 15, it is possible to bring the male and female elements further closer, as illustrated by the arrow F9 in FIG. 15. Actually, this additional movement F9 causes the distal portion 104.1 of the plug 104 to move back in contact with the female element 200 since the shoulder 208 of the latter is in abutment against the flange 104b. The backward movement of the distal portion 104.1 is carried out against the elastic action of the spring 122, i.e. the latter is compressed. This additional movement F9 exerted by the operator by forcing the introduction of the male element into the female element causes the axial play d7 to be caught up. Thus, this axial play d7 forms an over travel distance required for uncoupling. In parallel, the locking ring 106 has also moved back, so that there exits a play d8 between the proximal crown 106a of the ring 106 and the shoulder 102a delimited in the body 202. This play d8 corresponds to the sum of the plays d6 and d7 and is quite significant for releasing the action of the control member 108. The lever 108 may therefore be swung, as illustrated by the arrow R1 in FIG. 15. Thus, the male element 100 according to the third embodiment may be used with a larger range of female elements, notably with a female element with short claws, i.e. this male element is more «tolerant» to dimensional manufacturing constraints. This male element may also be used with a female element for which the pusher 204 is short.

In an alternative not shown applicable to the third embodiment of the male element, the distal portion 104.1 of the plug 104, i.e. the portion including the flange 104b is partly fitted in inside the proximal portion 104.2.

According to another alternative not shown applicable to the third embodiment, the fitting in of the portions 104.1 and 104.2 may be carried out by means of a guiding system with a spline or a groove. The abutment member 126 may then assume the form of a pin or a key replacing ball stop 126 and having the same function than ball stop 126. The abutment member 126 may equally be attached to the distal portion of the plug, to the proximal portion of the plug or be free between both portions, benefiting from an axial displacement such as a ball in a housing.

According to another alternative not shown, applicable to the third embodiment, the portions 104.1 and 104.2 of the plug 104 are in one piece or are secured to each other and the plug 104 is movable in its entirety inside the body 102. In this case, a spring or another return means is provided for maintaining the plug in the advanced position. The plug 104 only therefore retracts in the body 102 if over travel is required for releasing the control member 108.

In an alternative not shown, applicable to all the embodiments, a maneuvering member other than a lever may equip the connector R. For example, the maneuvering member 108 may be an outer axially maneuverable ring from front to rear and acting on an internal swinging lever system for pushing the sleeve 116. It is also conceivable to use a radial push button coupled with a wedge system for pushing the sleeve 116.

In an alternative not shown applicable to all the embodiments, the female element 200 does not come into contact with the probing ring 114 upon coupling.

In an alternative not shown applicable to all the embodiments, the second portion of the locking device may not jut out from the body and always have an end accessible to the mouth 102.1 of the body.

In an alternative not shown applicable to the first and to the last embodiment of the male element, the probing ring 114 may be replaced with one or several "probing" fingers, which at least have one protruding abutment, adapted for pushing the ring 106.

According to another embodiment not shown, applicable to all the embodiments, the sleeve 116 is close to the flange 104b in its second position so that the sleeve is movable between a remote position and a position close to the flange, without contact with the latter.

According to another alternative not shown, applicable to the last embodiment, an elastic compressive member bears against the probing ring 114 on the one hand and against the sleeve 116 on the other hand. This elastic member then ensures return of the ring 114 into the distal position and the return of the sleeve into its first position. For example, this elastic member is a spring inserted between the flange 116a of the sleeve 116 and a shoulder of the ring 114. This amounts to considering that a ring, of the type of the ring 124, is axially inserted between the parts 114 and 116 and mounted around the sleeve 116 in a comparable way to the spring 118 in the first embodiment.

According to a last alternative not shown, applicable to the first two embodiments, the spring 118 is suppressed and is replaced with a spring positioned at the rear of the device 105. This spring is then supported between the centering part 112 and the device 105.

The technical characteristics of the alternatives and embodiments contemplated above may be combined together in order to generate new embodiments of the invention.

The invention claimed is:
1. A male fluidic connecting element, comprising:
a tubular body, which defines a central axis and a distal mouth, and a tubular plug for passage of the fluid, which is positioned coaxially inside the body and which includes a flange, wherein the male connecting element further comprises:
  a sleeve, which is axially movable around the plug between a first position, where the sleeve is away from the flange, and a second position, where the sleeve is closer to the flange or in abutment against the flange,
  a control member for controlling the displacement of the sleeve from its first to its second position, and
  a locking device for locking the control member, including:
    a first portion able to slide inside the body around the tubular plug between a distal position of the first portion, where it prevents maneuvering of the control member, and a proximal position of the first portion, where it does not oppose any maneuvering of the control member for displacing the sleeve from its first to its second position, and
    a second portion, which is able to slide inside the body around the tubular plug between a distal position of the second portion and a proximal position of the second portion, which is able to drive the first portion of the device from its distal position to its proximal position and which has an end accessible to the mouth of the body.

2. The male element according to claim 1, wherein the control member comprises a jointed lever on the body around an orthoradial axis to the central axis and wherein the lever comprises a finger for pushing the sleeve towards its second position, which extends through an aperture of the first portion of the locking device.

3. The male element according to claim 2, wherein the lever includes a heel for blocking the pivoting of the lever, which abuts against the first portion of the locking device when the latter is in a distal position.

4. The male element according to claim 1, wherein the sleeve has an outer diameter greater than the diameter of the flange of the plug.

5. The male element according to claim 1, wherein the first portion of the locking device is a locking ring and the second portion of the locking device is a probing ring which is axially shifted, along the central axis with respect to the locking ring, and which is able to push back the locking ring towards its proximal position.

6. The male element according to claim 5, wherein the probing ring is axially movable with respect to the body without driving the locking ring between its distal position and an intermediate position, where it contacts the locking ring.

7. The male element according to claim 5, wherein it comprises a member exerting an elastic return force on the locking ring in its distal position.

8. The male element according to claim 1, wherein the tubular plug comprises a proximal portion and a distal portion, bearing that the flange and axially movable with respect to the body against the return force of a spring between an advanced position and a set-back position.

9. The male element according to claim 8, wherein the proximal portion of the plug is fixed with respect to the body and in that the plug includes a ball for stopping the distal portion of the plug in advanced position.

10. The male element according to claim 1, wherein the locking device is a one-piece assembly consisting of a first proximal portion and of a second distal portion, the assembly being movable between a distal position where the proximal portion of the locking device prevents maneuvering of the control member, and a proximal position where the proximal portion does not oppose maneuvering of the control member.

11. The male element according to claim 1, wherein it comprises an elastic compressive member, which is supported between the second portion of the locking device on the one hand and, on the other hand, the sleeve, and which is able to ensure the return of the second portion into its distal position and of the sleeve into its first position.

12. A fluidic connector, wherein it includes a male element according to claim 1 and a female element including at least one claw, having a hooking-up surface for hooking up to the flange of the male element, and wherein the sleeve is able to disengage the claw when the latter is moved from its first to its second position.

13. The fluidic connector according to claim 12, wherein the female element comprises a pusher, having a pushing surface for pushing an end of the second portion of the locking device, this end being accessible to the pusher at the mouth of the body.

14. The fluidic connector according to claim 13, wherein a distance between the hooking-up surface and the pushing surface is greater than a distance, measured in parallel with the central axis, between a blocking face belonging to the flange and a contact surface between the second portion of the locking device in its distal position and the female element.

15. The fluidic connector according to of claim 12, wherein the first portion of the locking device prevents maneuvering of the control member when the surface for hooking up the claw is engaged with the flange of the male element.

16. The fluidic connector according to claim 12, wherein the control member is maneuverable after bringing the male and female closer to each other with respect to a coupled configuration of the connector.

* * * * *